United States Patent
Toshine

(10) Patent No.: US 7,395,368 B2
(45) Date of Patent: Jul. 1, 2008

(54) INFORMATION PROCESSING SYSTEM, STORAGE UNIT, AND STORAGE CONTROL PROGRAM RECORDED COMPUTER-READABLE RECORDING MEDIUM

(75) Inventor: Naoyoshi Toshine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 11/055,099

(22) Filed: Feb. 11, 2005

(65) Prior Publication Data

US 2006/0106979 A1 May 18, 2006

(30) Foreign Application Priority Data

Nov. 16, 2004 (JP) .............................. 2004-331562

(51) Int. Cl.
*G06F 12/00* (2006.01)
(52) U.S. Cl. ...................................... 711/111; 711/112
(58) Field of Classification Search ....................... None
See application file for complete search history.

(56) References Cited

U.S. PATENT DOCUMENTS 6,233,653 B1 5/2001 Abe et al. .................... 711/113
7,032,128 B2 * 4/2006 Nakano ........................ 714/11
2003/0149918 A1 8/2003 Takaichi ....................... 714/42

FOREIGN PATENT DOCUMENTS

| JP | 5-88975 | 4/1993 |
|----|---------|--------|
| JP | 2000-235457 | 8/2000 |
| KR | 2003-0015305 | 2/2003 |

* cited by examiner

*Primary Examiner*—Reginald Bragdon
*Assistant Examiner*—Horace L Flournoy
(74) *Attorney, Agent, or Firm*—Staas & Halsey LLP

(57) ABSTRACT

According to the present invention, for reliably carrying out a request for access to processing data which is an object of processing in a data processing apparatus even if the processing data is not retained in a storage unit, the storage unit includes a first timer for detecting the fact that an elapsed time for the readout processing in the readout unit reaches a first predetermined time set in advance, and a first response unit for, when the processing in the readout unit continues after the detection of the first predetermined time by the first timer, transmitting a signal indicative of normal in-operation to the data processing apparatus. Moreover, the data processing apparatus includes an implementation unit for, when receiving the signal indicative of the normal in-operation from the first response unit, conducting the processing on the re-issue of the processing data access request.

18 Claims, 4 Drawing Sheets

INFORMATION PROCESSING SYSTEM, STORAGE UNIT, AND STORAGE CONTROL PROGRAM RECORDED COMPUTER-READABLE RECORDING MEDIUM

BACKGROUND OF THE INVENTION

1.) Field of the Invention

The present invention relates to a large-capacity information processing system in which a library unit and a storage unit are disposed in hierarchical relation.

2.) Description of the Related Art

In general, a large-capacity information processing system (information managing system) has principally employed a library unit functioning as a large-capacity external storage unit. This library unit, accommodating a large number of recording mediums such as a magnetic tapes or optical disks, has a function to gain access automatically to data in each recording medium.

However, the readout processing or write processing on information between this library unit and a data processing apparatus (for example, host computer) requires extremely much time, which has forced the library unit to use as a backup unit.

Meanwhile, although a hard disk unit (storage unit) having a hard disk (magnetic disk) is capable of gaining high-speed access, it requires an overwhelming higher cost in comparison with a magnetic tape, an optical disk or the like, so difficulty is experienced in realizing a large-capacity information processing system employing only a hard disk.

For this reason, an information processing system (which will hereinafter be referred to as a "hierarchical storage system") has been employed, which realizes low cost and high-speed access simultaneously in such a manner as to arrange high-speed access-gainable hard disk units (storage units) and library units hierarchically (for example, see Japanese Patent Laid-Open No. HEI 5-88975).

However, since the hierarchical storage system disclosed in Japanese Patent Laid-Open No. HEI 5-88975 is designed to efficiently manage data between a library unit and a hard disk unit through the use of management on a host computer which issues a request on access to data, the host computer serving as a user is required to pay attention to each of the library unit and the hard disk unit.

In addition, management software, which is for managing the hierarchical storage (library unit and hard disk unit), is provided on the host computer, and this bears heavily not only upon the resources of the computer but also the user's network resources because there is a need to make, through the use of a LAN (Local Area Network) or the like, a connection between the host computer and the library unit and a connection between the host computer and the hard disk unit.

Therefore, there has been proposed a technique in which, instead of on a host computer, management software for the management of a hierarchical storage is provided on a hierarchical storage to achieve the management through the hierarchical storage itself without using the resources of a host computer serving as a user (for example, Japanese Patent Laid-Open No. 2000-235457).

Meanwhile, in a case in which, after the issue of a host I/O (Input/Output; input/output request), the waiting time for a response to this I/O exceeds a predetermined period of time, a host computer has so far been made to detect the time-out (error) for canceling the processing on this I/O request, which avoids a wasteful long waiting time for the host I/O, thus achieving efficient processing.

Although it is desirable that a host computer detects the time-out even in the technique disclosed in Japanese Patent Laid-Open No. 2000-235457, if a hard disk unit does not retain data which is an object of an access request (I/O request) issued from the host computer (data which is an object of processing in the host computer), in the case of the technique disclosed in Japanese Patent Laid-Open No. 2000-235457, there is a need to read out this processing data from a library unit. Thus, in the case of the issue of access to the library unit, an extremely longer waiting time occurs in the host computer in comparison with the case in which the hard disk unit retains the processing data.

For this reason, even if the hierarchical storage system disclosed in Japanese Patent Laid-Open No. 2000-235457 employs a facility designed so that a host computer detects the time-out, in a case in which the processing data is read out from the library unit, a long waiting time occurs in the host computer even though it is in a normal operation according to an access request from the host computer, which can cause the host computer to detect the time-out (error).

SUMMARY OF THE INVENTION

The present invention has been developed with a view to eliminating these problems, and it is therefore an object of the invention to, in an information processing system including a library unit(s) and a storage unit(s) disposed hierarchically, reliably carry out a request on access to data which is an object of processing even if the processing data for a data processing apparatus is not retained in the storage unit.

For this purpose, in accordance with an aspect of the present invention, there is provided an information processing system comprising a library unit for retaining data, a storage unit connected to the library unit and having a storage for retaining a portion of the data of the library unit and a data processing apparatus connected to the storage unit for gaining access to the data of the storage of the storage unit, wherein the storage unit includes a readout unit for, when processing data which is an object of processing in the data processing apparatus is not retained in the storage of the storage unit, reading the processing data from the library unit into the storage according to a request from the data processing apparatus for access to the processing data, a first timer for, when the readout unit reads the processing data from the library unit into the storage according to the access request from the data processing apparatus, detecting the fact or event that an elapsed time for readout processing in the readout unit reaches a first predetermined time set in advance, and a first response unit for, when the processing in the readout unit continues after the first timer detects the first predetermined time, transmitting a signal indicative of the fact that the readout unit is normally in operation to the data processing apparatus, and the data processing apparatus includes an implementation unit for, upon receipt of the signal indicative of the normal in-operation from the first response unit, implementing re-issue of the processing data access request.

Preferably, the storage unit includes a second timer for detecting the fact that an elapsed time after the reception of the access request reaches a second predetermined time longer than the first predetermined time to be detected by the first timer and a second response unit for, when the transmission of the signal from the first response unit does not take place after the detection of the second predetermined time by the second timer, transmitting an error signal indicative of the occurrence of an abnormality (or failure) of the processing in the storage unit to the data processing apparatus.

In addition, for the above-mentioned purpose, in accordance with another aspect of the present invention, there is provided a storage unit interposed between a library unit for retaining data and a data processing apparatus for processing the data, comprising a storage for retaining a portion of data in the library unit to be accessible from the data processing apparatus, a readout unit for, when data which is an object of processing in the data processing apparatus is not retained in the storage, reading the processing data from the library unit into the storage according to a request from the data processing apparatus for access to the processing data, a first timer for, when the readout unit reads the processing data from the library unit into the storage according to the access request from the data processing apparatus, detecting the fact that an elapsed time for readout processing in the readout unit reaches a first predetermined time set in advance, and a first response unit for, when the processing in the readout unit continues after the detection of the first predetermined time by the first timer, transmitting a signal indicative of the fact that the readout unit is normally in operation to the data processing apparatus so as to make the data processing apparatus re-issue the processing data access request.

Still additionally, for the above-mentioned purpose, in accordance with a further aspect of the present invention, there is provided a storage control program which makes a computer realize a function to control a storage unit interposed between a library unit made to retain data and a data processing apparatus made to process the data and having a storage for retaining a portion of data in the library unit to be accessible from the data processing apparatus, the storage control program making the computer function as a readout unit for, when data which is an object of processing in the data processing apparatus is not retained in the storage, reading the processing data from the library unit into the storage according to a request from the data processing apparatus for access to the processing data, a first timer for, when the readout unit reads the processing data from the library unit into the storage according to the access request from the data processing apparatus, detecting the fact that an elapsed time for readout processing in the readout unit reaches a first predetermined time set in advance, and a first response unit for, when the processing in the readout unit continues after the detection of the first predetermined time by the first timer, transmitting a signal indicative of the fact that the readout unit is normally in operation to the data processing apparatus so as to make the data processing apparatus re-issue the processing data access request.

Yet additionally, for the above-mentioned purpose, a computer-readable recording medium according to the present invention records the above-described storage control program.

According to the present invention, even in a case in which data which is an object of processing in a data processing apparatus does not exist in a storage and there is a need to read out this processing data from a library unit, if the readout of the processing data by the readout unit is normally in implementation, for re-issuing the access request from the data processing apparatus to continue the readout of the processing data, the first response unit transmits a signal, indicating that the readout unit is normally in operation for processing, to the data processing apparatus after the first timer detects the elapse of the first predetermined time. This enables reliably carrying out the access request without requiring the detection of the time-out of the access request to the processing data by the data processing apparatus.

Thus, the data processing apparatus can gain access to a large volume of data retained in the library unit as though it were arranged with only the storage unit without paying attention to the library unit. Therefore, according to the present invention, the realization of a hierarchical virtual storage system in which the data processing apparatus is not required to pay attention to the library unit enables the utilization of fast access property and high availability of the storage unit and, because the data processing apparatus is not required to have a management software for managing the hierarchical storage (library unit and storage unit), permits the realization of a considerable cost reduction without bearing heavily upon the resources of the data processing apparatus.

Moreover, according to the present invention, if the first response unit does not transmit any signal after the detection of the second predetermined time by the second timer, then the second response unit transmits an error signal, indicating the occurrence of an abnormality of the processing in the storage unit, to the data processing apparatus. This can previously detect the time-out of the access request when the processing in the storage unit slows down to cause a delay of the processing, thereby reliably enabling the cancellation of the delayed processing to assure the efficient processing while eliminating a wasteful long waiting time.

DESCRIPTION OF THE PREFERRED EMBODIMENTS

An embodiment of the present invention will be described hereinbelow with reference to the drawings.

[1] About embodiment of the Present Invention

Figure 1:
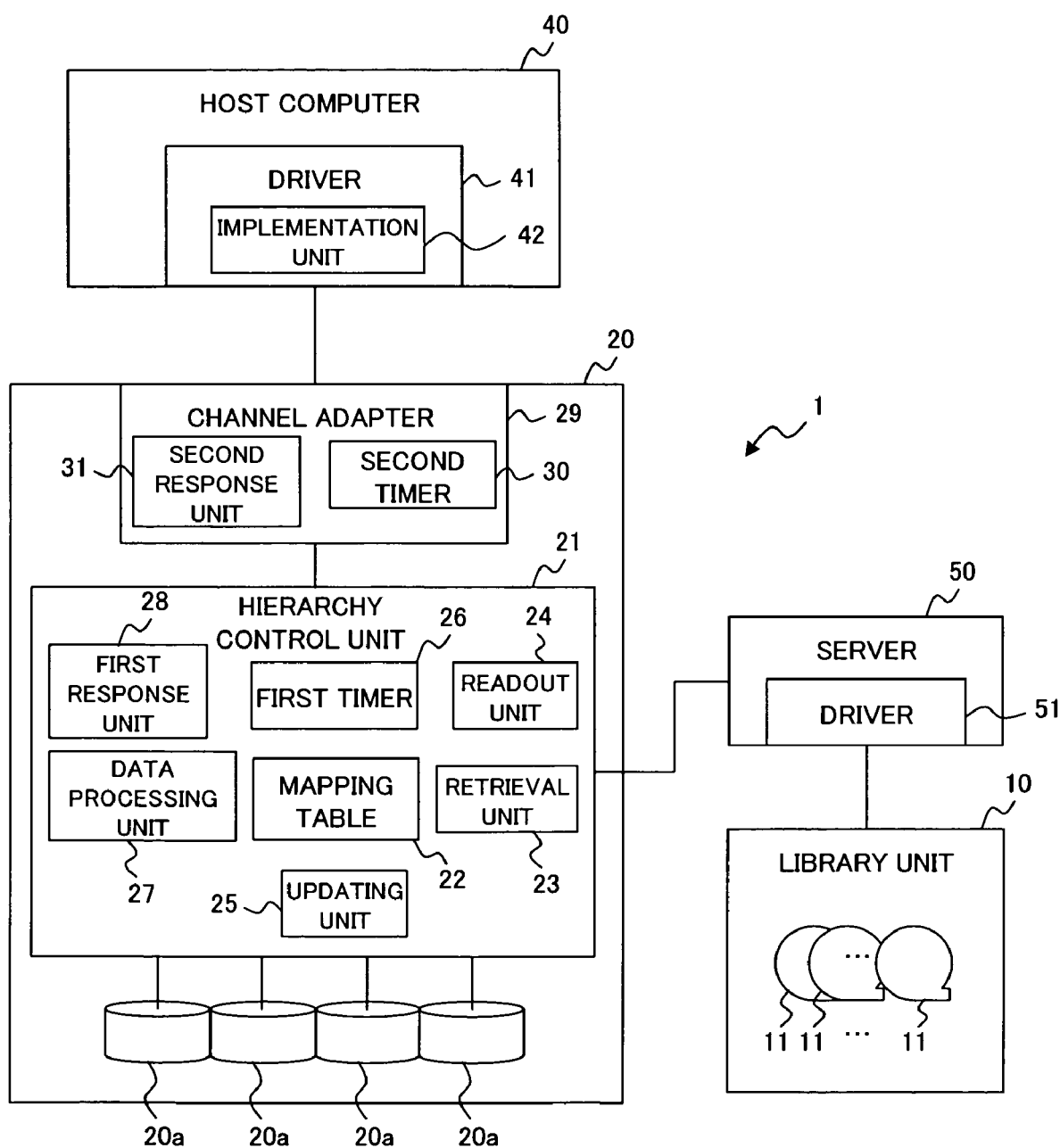
FIG. 1 is a block diagram showing a configuration of an information processing system according to an embodiment of the present invention.

[1-1] About Configuration of Information Processing System 1 According to Embodiment of the Present Invention First of all, referring to the block diagram of FIG. 1, a description will be given hereinbelow of a configuration of the information processing system 1 according to the embodiment of the present invention. As FIG. 1 shows, this information processing system 1 is a hierarchical storage system and is made up of a library unit 10, a hard disk unit (storage unit) 20, a host computer (data processing apparatus) 40 and a server 50.

The library unit 10 is provided with a plurality of recording mediums 11 such as magnetic tapes or optical disks, and each of the recording mediums 11 retains the processing data which is an object of processing in the host computer 40.

In addition, for example, the library unit 10 is equipped with a shelf (not shown) for accommodating the plurality of recording mediums 11, a drive unit (not shown) for carrying out the access to the recording mediums 11, and an accessor (not shown) for shifting the recording mediums 11, accommodated in the shelf, to the drive unit. In the case of accessing data retained in the recording mediums 11, there is a need to control the accessor for shifting the recording medium 11 from the shelf to the drive unit, which requires a long time for reading out data from the recording medium 11.

The hard disk unit 20 is connected to the library unit 10 and is composed of a plurality of magnetic disks (storage; which will be referred to hereinafter as a "hard disk") 20a to which access is gainable at a higher speed than that to the recording mediums 11 of the library unit 10, and which are capable of retaining a portion of data retained in the library unit 10.

The host computer 40 is connected to the hard disk unit 20 to gain access [for example, issue an I/O (Input/Output) request such as read request or write request] to data in the plurality of hard disks 20a of the hard disk unit 20.

In this case, the hard disk unit 20 is made to read out required data (that is, data which is an object of processing related to this access request) from the recording medium(s) 11 of the library unit 10 according to an access request from the host computer 40 for putting it in the hard disk 20a, and the host computer 40 gains access to only the hard disk unit 20.

Moreover, the hard disk unit 20 is composed of a hierarchy control unit (VDE: Virtual Disk Engine) 21 and a channel adapter 29.

The hierarchy control unit 21 is made to control the interchange of data to be made through the server 50 between the hard disk unit 20 and the library unit 10 according to an access request from the host computer 40, and it is composed of a mapping table 22, a retrieval unit 23, a readout unit 24, an updating unit 25, a first timer 26, a data processing unit 27 and a first response unit 28.

The mapping table 22 shows the corresponding relation between the data retained in the hard disk 20a of the hard disk unit 20 and the data retained in the recording medium 11 of the library unit 10 and, for example, has information representative of data retained in the hard disk 20a (information indicative of the contents of data, address on the hard disk 20a where the data exists, or the like) and address of the data on the recording medium 11 in a state paired.

The retrieval unit 23, according to an access request from the host computer 40, makes a retrieval on data which is an object of processing related to the access request on the basis of the mapping table 22, thereby making a decision as to whether this processing data is retained in the hard disk 20a.

That is, when the processing data on the access request from the host computer 40 is retrieved from the mapping table 22, the retrieval unit 23 makes a decision that the processing data is retained in the hard disk 20a.

When the retrieval unit 23 decides that the data which is an object of processing in the host computer 40 (that is, data which is an object of access request from the host computer 40) is not retained in the hard disk 20a, the readout unit 24 reads (recall) the processing data from the recording medium 11 of the library unit 10 into the hard disk 20a according to the processing data access request from the host computer 40.

The data readout processing from the recording medium 11 of the library unit 10 by the readout unit 24 is conducted through the server 50 interposed between the library unit 10 and the hard disk unit 20.

That is, the server 50 is for carrying out the transmission/reception of data between the library unit 10 and the hard disk unit 20 and, for example, when the readout unit 24 reads out the data from the library unit 10 in order to copy the data retained in the recording medium 11 of the library unit 10 into the hard disk 20a of the hard disk unit 20, the readout unit 24 issues a readout request for this data to the server 50 and, upon receipt of this readout request, the server 50 reads out this data from the recording medium 11 of the library unit 10 through its own driver 51 and transfers it to the hard disk unit 20.

The updating unit 25 is for updating the mapping table 22 and is made to update the mapping table 22 when the readout (copy) of the data from the recording medium 11 into the hard disk 20a by the readout unit 24 reaches completion.

The first timer 26 is made to detect that an elapsed time for the readout processing reaches a first predetermined time (time period) set in advance (i.e., the first predetermined time elapses in terms of the readout processing in the readout unit 24) (in this case, it is taken as t1) in a case in which the readout unit 24 reads the processing data from the recording medium 11 of the library unit 10 into the hard disk 20a in response to an access request from the host computer 40, that is, when a decision in the retrieval unit 23 shows that the data which is an object of processing in the host computer 40 is not retained in the hard disk 20a.

More concretely, the first timer 26 is activated in response to the start of the readout processing in the readout unit 24 and measures, as a readout processing time, the time elapsed from the start of the readout processing in the readout unit 24 to detect the first predetermined time t1 on the basis of the measured readout processing time.

The data processing unit 27 is designed to carry out a command with respect to the processing data according to the access request from the host computer 40 and, for example, in the case of a read request from the host computer 40, the data processing unit 27 transmits the data, which is an object of processing on the read request, from the storage 20a to the host computer 40 while, in the case of a write request from the host computer 40, the data processing unit 27 conducts the write processing in the processing data according to the write request.

In this case, if data is newly written by the data processing unit 27, then the mapping table 22 is updated by the updating unit 25 and the written data is preserved in the recording medium 11 through the server 50. Moreover, when the data preserved in the hard disk 20a is rewritten by the data processing unit 27, the mapping table 22 is updated by the updating unit 25 and the rewritten data is preserved in the recording medium 11 through the server 50.

In this connection, in a case in which the hard disk 20a does not preserve the data which is an object of processing on an access request from the host computer 40 and the readout unit 24 reads out this processing data from the library unit 10, the data processing unit 27 carries out command processing after the readout of the processing data into the hard disk 20a by the readout unit 24 reaches completion.

The first response unit 28 is made to transmit a signal (sense), indicative of the fact that the readout unit 24 is normally in operation for the processing (that is, processing in the hard disk unit 20), through the channel adapter 29 to the host computer 40 in a case in which the readout processing on the processing data from the recording medium 11 into the hard disk 20a normally continues after the first timer 26 detects the elapse of the first predetermined time.

In addition, when transmitting the signal indicative of the normal in-operation, the first response unit 28 cancels a command on an access request received from the host computer 40 in a state where the processing data readout continues in the readout unit 24.

Incidentally, the signal (normality response) representative of the normal in-operation, transmitted from the first response unit 28, indicates the temporary waiting with respect to the host computer 40, and the elapse of the first predetermined time detected by the first timer 26 does not indicate an abnormality but signifying only that it takes a long time to read out processing data from the library unit 10.

Still additionally, in a case in which the occurrence of an abnormality (or failure) of the processing in the readout unit 24 is detected before the first timer 26 detects the elapse of the first predetermined time, the first response unit 28 transmits an error signal (error sense), indicating the occurrence of an abnormality of the processing in the readout unit 24, through the channel adapter 29 to the host computer 40.

At this time, the first response unit 28 cancels a command on an access request received from the host computer 40 and suspends the processing in the readout unit 24.

Yet additionally, in a case in which the access request from the host computer 40 normally reaches completion before the first timer 26 detects the elapse of the first predetermined time (for example, in a case in which, when a read request is issued from the host computer 40, the readout unit 24 copies the data, which is an object of processing on the read request from the host computer 40, onto the hard disk 20a and the data processing unit 27 finishes the transfer processing on all the processing data to the host computer 40), the first response unit 28 transmits a signal (status), indicative of the fact that the access request normally reaches completion, through the channel adapter 29 to the host computer 40.

That is, the first response unit 28 has (1) a first function (normality response function) to transmit a signal (normality response; sense), indicative of the fact that the readout unit 24 is in normal operation for the processing, to the host computer 40 in a case in which the readout unit 24 is still operating normally for the processing after the first timer 26 detects the first predetermined time, (2) a second function (abnormality response function) to transmit an error signal (abnormality response; error sense), indicative of the occurrence of an abnormality of processing in the readout unit 24, to the host computer 40 in a case in which the occurrence of the abnormality of the processing in the readout 24 is detected before the first timer detects the first predetermined time, and (3) a third function to transmit a signal (normal completion response; status) indicative of the normal completion of an access request from the host computer 40 in a case in which the access request reaches completion before the first timer 26 detects the first predetermined time.

In this connection, also when transmitting the above-mentioned signal (sense) indicative of the normal in-operation and the aforesaid error signal (error sense) indicative of the occurrence of an abnormality of the processing in the readout unit 24, the first response unit 28 makes the status response along with these senses.

The channel adapter 29 is for carrying out the transmission/reception of information with respect to a driver 41 (which will be mentioned later) of the host computer 40, and the transmission/reception of information between the host computer 40 and the hard disk unit 20 is conducted through the channel adapter 29 and the driver 41.

In addition, the channel adapter 29 is equipped with a second timer 30 and a second response unit 31.

The second timer 30 is activated when the channel adapter 29 receives an access request from the host computer 40 and detects that the elapsed time after the reception of the access request reaches a second predetermined time (period of time) (in this case, t1+t2) set to be longer than the first predetermined time (t1) to be detected by the first timer 26 of the hierarchy control unit 21.

The second response unit 31 is made to transmit an error signal (error sense) indicative of the occurrence of an abnormality of processing in the hard disk unit 20 to the host computer 40 in a case in which, after the second timer 30 detects the second predetermined time, the first response unit 28 of the hierarchy control unit 21 does not transmit (1) a signal indicative of the fact that the readout unit 24 is in normal operation for the processing, (2) an error signal indicative of the fact that an abnormality occurs on the processing by the readout unit 24 or (3) a signal indicative of the fact that an access request from the host computer 40 reaches completion.

The error signal to be transmitted from the second response unit 31 indicates that any abnormality occurs with respect to the processing in the hard disk unit 20 and, in this case, signifies particularly the occurrence of a slowdown of processing or a delay of processing in the hierarchy control unit 21.

Moreover, when transmitting this signal, the second response unit 31 cancels a command on the access request received from the host computer 40 and suspends the processing in the hierarchy control unit 21 (that is, the processing by the readout unit 24 or the data processing unit 27).

The host computer 40 is made to, as mentioned above, gain access to a portion of the processing data of the library unit 10, retained in the hard disk 20a of the hard disk unit 20, to issue a request (read request, write request, or the like) for access to the processing data, and is equipped with the driver 41.

The driver 41 is made to, as mentioned above, make the interchange of information with respect to the channel adapter 29 of the hard disk unit 20 and is equipped with an implementation unit 42.

The implementation unit 42 is made to, upon receipt of a signal from the first response unit 28 and the second response unit 31 in the hard disk unit 20, carry out the processing on the basis of the received signal, and is for, upon receipt of a signal (normality response) from the first response unit 28 which is indicative of the fact that the readout unit 24 is normally in operation for the readout of the processing data on the access request from the host computer 40, conducting the processing on the re-issue of the processing data access request so as to continue (retry) this normal in-operation processing (that is, in the readout unit 24, the processing on the readout of the processing data from the library unit 10). In this connection, the implementation unit 42 conducts the processing on the re-issue of the access request any number of times without detecting the time-out until the access request reaches normal completion as long as it receives the normality response from the first response unit 28.

On the other hand, when receiving, from the first response unit 28, a signal (abnormality response) indicative of the occurrence of an abnormality of the readout of the processing data on the access request issued from the host computer 40 in the readout unit 24, the implementation unit 42 does not conduct the processing on the re-issue of the access request related to the occurrence of the abnormality but, for example, it notifies, to an arithmetic unit (not shown) of the host computer 40, the fact of cancellation stemming from the occurrence of the abnormality with respect to the access request.

Moreover, upon receipt of a signal (normal completion response) from the first response unit 28 which is indicative of the normal completion of the access request from the host computer 40, for example, the implementation unit 42 notifies the normal completion of the access request to the arithmetic unit (not shown) of the host computer 40.

Still moreover, upon receipt of a signal from the second response unit 31 which is indicative of the occurrence of an abnormality of the processing (for example, the readout processing in the readout unit 24 or the processing in the data processing unit 27) in the hierarchy control unit 21 with respect to the processing data related to the access request issued from the host computer 40, the implementation unit 42 makes a decision that a slowdown or delay occurs with respect to the processing in the hierarchy control unit 21 where such an abnormality occurs and detects the cancellation of this processing and, for example, notifies the fact of the cancellation stemming from the processing slowdown (delay) on the access request to the arithmetic unit (not shown) of the host computer 40 without re-issuing the access request related to the occurrence of the abnormality.

[1-2] About Operation in Information Processing System 1 According to Embodiment of the Present invention (in the Case of Signal being Transmitted from First Response Unit 28)

Figure 2:
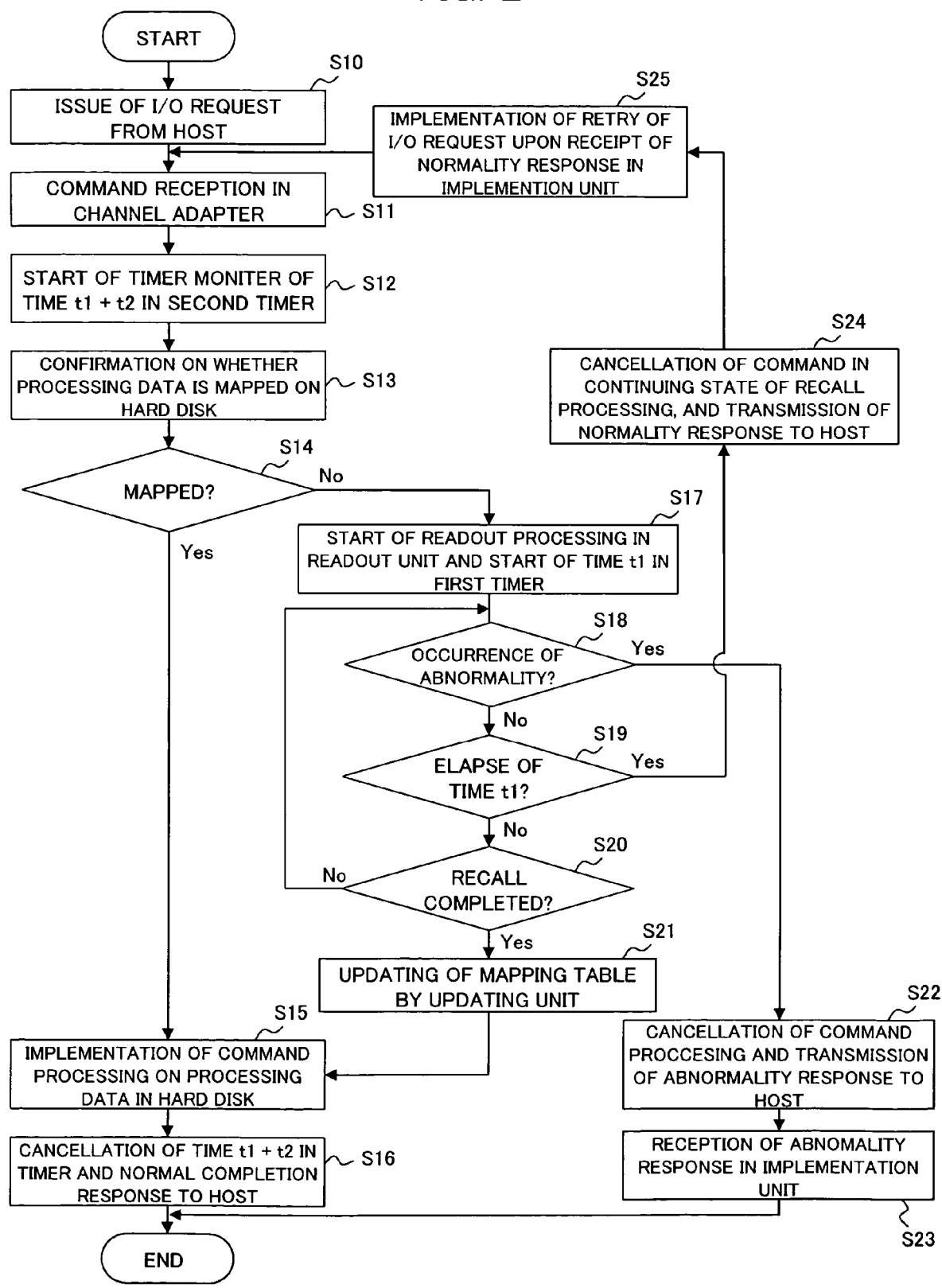
FIG. 2 is a flow chart useful for explaining an example of an operation of the information processing system according to the embodiment of the present invention.

Secondly, referring to a flow chart (steps S10 to S25) of FIG. 2, a description will be given herein below of an operation of this information processing system 1 in a case in which the first response unit 28 transmits a signal.

First of all, the host computer 40 (shown as "host" in the illustration) issues an access request (I/O request) through the driver 41 (step S10) and, when the channel adapter 29 of the hard disk unit 20 receives this access request (command) (step S11), the second timer 30 of the channel adapter 29 starts to detect (timer monitor) the elapse of the second predetermined time (t1+t2 time) (step S12).

Moreover, the retrieval unit 23 of the hierarchy control unit 21 makes a retrieval on the mapping table 22 to make a decision as to whether or not the data which is an object of processing with respect to the access request from the host computer 40 is retained (mapped) in the hard disk 20a (step S13) and, when the decision in the retrieval unit 23 shows that the processing data is retained in the hard disk 20a (that is, the map is present) (Yes route of step S14), the data processing unit 27 carries out the command processing on the processing data on the hard disk 20a (step S15).

Still moreover, when the command processing in the data processing unit 27 reaches completion, the first response unit 28 transmits a normal completion response to the host computer 40 and makes the cancellation on the detection of the elapse of the second predetermined time by the second timer 30, thereafter terminating the processing (step S16).

On the other hand, if the retrieval unit 23 makes a decision that the processing data is not retained in the hard disk 20a (map is absent) (No route of step S14), then the readout unit 24 reads out (recalls) the processing data from the recording medium 11 of the library unit 10, and the first timer 26 starts to detect (timer monitor) the elapse of the first predetermined time (t1 time) (step S17).

Furthermore, if no abnormality occurs with respect to the readout processing in the readout unit 24 (No route of step S18) and the readout (recall) of the processing data in the readout unit 24 reaches completion (Yes route of step S20), then the updating unit 25 updates the mapping table 22 (step S21) and the data processing unit 27 executes the command processing on the processing data (step S15), and the first response unit 28 transmits the normal completion response to the host computer 40 and makes the cancellation on the detection of the elapse of the second predetermined time by the second timer 30, thereafter terminating the processing (step S16).

Still furthermore, if a detection is made that an abnormality occurs with respect to the readout processing in the readout unit 24 before the first timer 26 detects the first predetermined time (Yes route of step S18), then the first response unit 28 makes the cancellation of the access request (command) related to the occurrence of an abnormality to suspend the readout processing in the readout unit 24 and transmits the abnormality response to the host computer 40 (step S22).

When receiving the abnormality response from the first response unit 28, the implementation unit 42 of the host computer 40 terminates the processing without conducting the processing on the re-issue of the access request (I/O) (step S23).

Yet furthermore, if the first timer 26 detects the elapse of the first predetermined time (Yes route of step S19) in a state where no detection is made of an abnormality of the processing in the readout unit 24 (No route of step S18), then the first response unit 28 cancels the command on the access request from the host computer 40 and transmits the normality response to the host computer 40 in a state where the processing (recall processing) continues in the readout unit 24 (step S24).

Moreover, upon receipt of the normality response from the first response unit 28, the implementation unit 42 conducts the processing on the re-issue of the access request related to the normality response to carry out the retry of this I/O request for continuing the processing in the readout unit 24 (step S25), and the operational flow then shifts to the aforesaid step S11.

[1-3] About Operation in Information Processing System 1 According to Embodiment of the Present Invention (in the Case of Signal being Transmitted from Second Response Unit 31)

Figure 3:
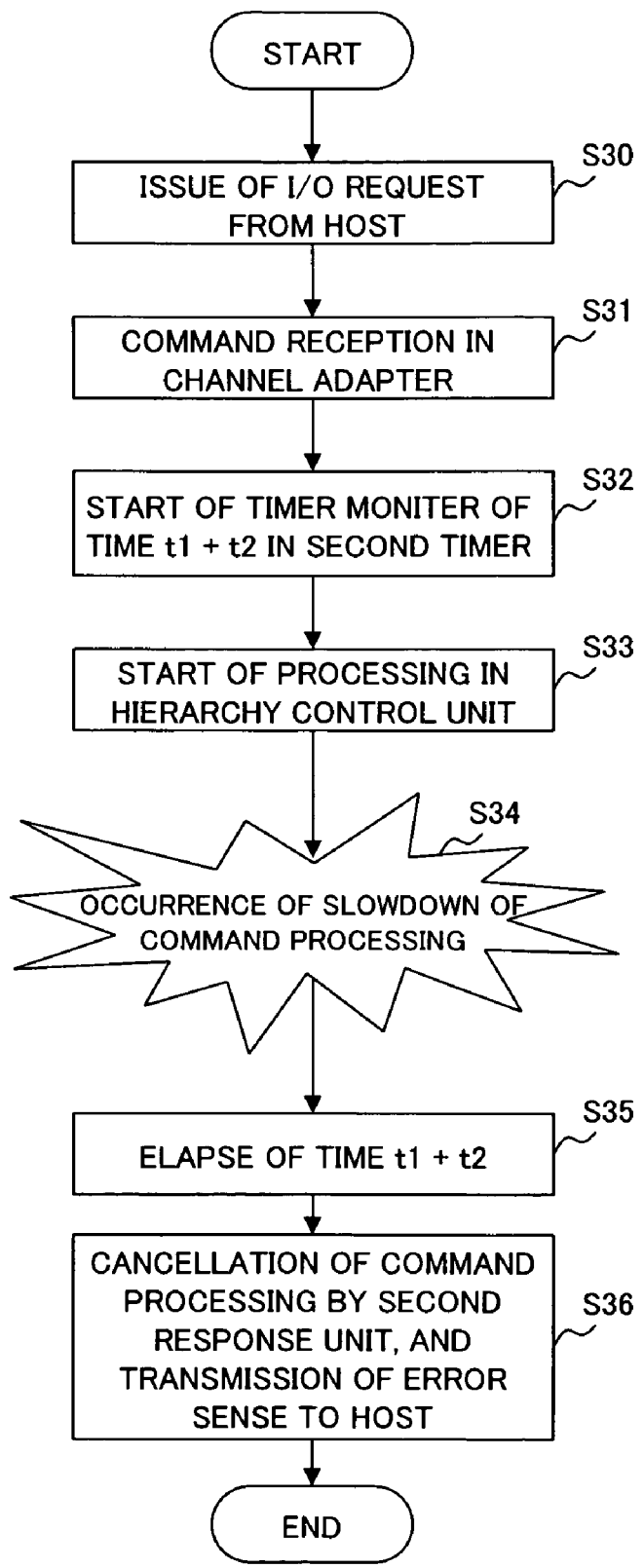
FIG. 3 is a flow chart useful for explaining an example of an operation of the information processing system according to the embodiment of the present invention.

In addition, referring to a flow chart (steps S30 to S36) of FIG. 3, a description will be given hereinbelow of an operation in this information processing system 1 in a case in which the second response unit 31 transmits a signal.

First, when the host computer 40 (shown as "host" in the illustration) issues an access request (I/O request) through the driver 41 (step S30) and, when the channel adapter 29 of the hard disk unit 20 receives this access request (command) (step S31), the second timer 30 of the channel adapter 29 starts to detect (timer monitor) the elapse of the second predetermined time (t1+t2 time) (step S32).

Moreover, the processing in the hierarchy control unit 21 starts (step S33) and, when a slowdown (delay) occurs on the command processing in the hierarchy control unit 21 (step S34) and the second timer 30 detects the elapse of the second predetermined time (step S35), the second response unit 31 cancels this command processing and transmits an error signal (error sense) indicative of the occurrence of an abnormality of the processing in the hierarchy control unit 21 to the host computer 40, thereafter terminating the processing (step S36).

Thus, in a case in which any signal (sense) response does not take place from the first response unit 28 of the hierarchy control unit 21 even if the processing in the hierarchy control unit 21 starts and the second timer detects the elapse of the second predetermined time, the second response unit 31 makes a decision that an abnormality (in this case, in particular, slowdown or delay) occurs on the processing in the hierarchy control unit 21, and cancels this command processing and transmits an error signal to the host computer 40.

Figure 4:
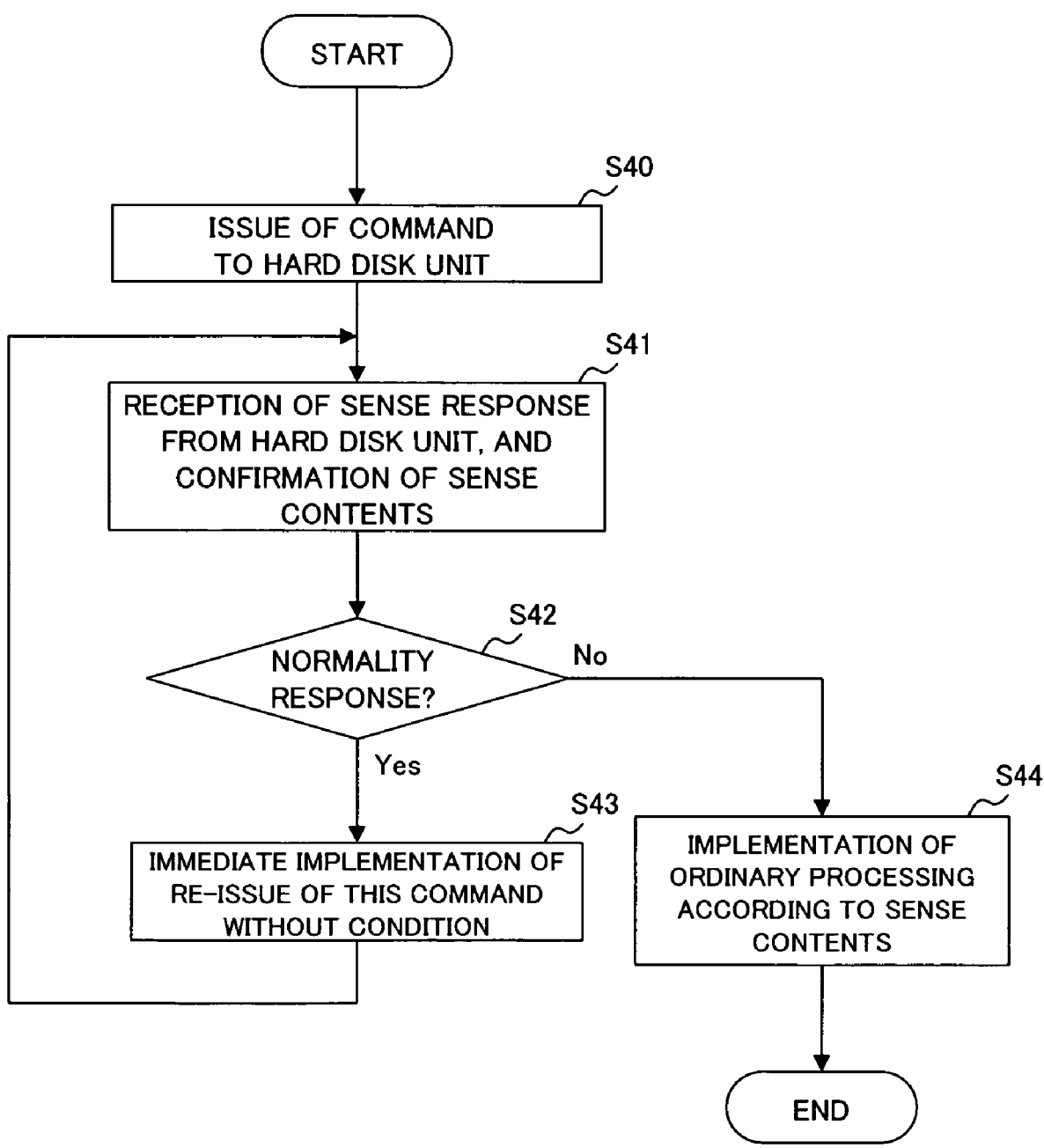
FIG. 4 is a flow chart useful for explaining a processing procedure in a data processing apparatus of the information processing system according to the embodiment of the present invention.

[1-4] About Operation in Information Processing System 1 (Processing in Host Computer 40) according to Embodiment of the Present Invention In addition, referring to a flow chart (steps S40 to S44) of FIG. 4, a description will be given herein below of an operation in the information processing system 1 according to the embodiment of the present invention, particularly, of a procedure of processing in the host computer 40.

First, the host computer 40 issues an access request (command) through the driver 41 to the hard disk unit 20 (step S40) and, when the driver 41 receives a signal (sense) response from the hard disk unit 20 afterward with respect to this command, the implementation unit 42 confirms the contents of the received signal (sense) (step S41).

At this time, if the received signal is a normality response from the first response unit 28 (Yes route of step S42), then the implementation unit 42 immediately conducts the processing on the re-issue of this command without condition (step S43).

On the other hand, if the received signal is not a normality response from the first response unit 28 (No route of step S42), then the implementation unit 42 carries out the ordinary processing according to the received signal (sense) response (step S44). That is, in a case in which the received signal (sense) shows an abnormality of the processing on the command in the hierarchy control unit 21, for example, it notifies the fact of the cancellation stemming from the occurrence of the abnormality of the command to the arithmetic unit (not shown) of the host computer 40.

[1-5] About the Effects Attainable by Information Processing System 1 according to Embodiment of the Present Invention As described above, with the information processing system 1 according to the embodiment of the present invention, even in a case in which the data which is an object of processing on an access request from the host computer 40 does not exist in the hard disk 20*a* of the hard disk unit 20 and there is a need to read out the processing data from the recording medium 11 of the library unit 10, if the readout unit 24 is in normal operation for the readout of the processing data, then the first response unit 28 transmits, to the host computer 40, a signal (normality response) indicative of the fact that the readout unit 24 is in normal operation for the processing after the first timer detects the elapse of the first predetermined time and, upon receipt of the normality response, the implementation unit 42 carries out the processing on the re-issue of this access request to continue the readout of the processing data. This enables executing the access request reliably without requiring the host computer 40 to detect the time-out of the request for access to the processing data.

Therefore, in this information processing system 1, the host computer 40 can gain access to a large volume of processing data retained in the recording medium 11 of the library unit 10 as though it were arranged with only the hard disk unit 20 without paying attention to the library unit 10. Accordingly, in this information processing system 1, the realization of a hierarchical virtual storage system in which the host computer 40 is not required to pay attention to the library unit 10 enables the utilization of fast access property and high availability of the hard disk unit 20 and, because there is no need for the host computer 40 to have a management software for managing the hierarchical storage (library unit 10 and hard disk unit 20), permits the realization of a considerable cost reduction without bearing heavily upon the resources of the host computer 40.

In addition, with this information processing system 1, in a case in which any signal response does not take place from the first response unit 28 after the second timer 30 detects the second predetermined time, the second response unit 31 makes a decision that the processing in the hierarchy control unit 21 slows down or delays and transmits, to the host computer 40, a signal indicative of the occurrence of an abnormality of the processing in the hierarchy control unit 21. Therefore, in a case in which the processing in the hierarchy control unit 21 slows down or delays with respect to an access request from the host computer 40, it is possible to detect the time-out of the access request in advance for reliably cancel the processing on the slowdown, which enables conducting the processing with high efficiency while avoiding a long-term wasteful waiting.

Still additionally, with this information processing system 1, in a case in which a decision is made as an abnormality occurs on the processing (processing data readout processing in the readout unit 24 and the processing in the data processing unit 27) in the hierarchy control unit 21, which is conducted on the basis of an access request from the host computer, after the first timer 26 detects the first predetermined time, the first response unit 28 transmits, to the host computer 40, a signal (abnormality response) indicative of the occurrence of an abnormality on the processing in the hierarchy control unit 21 and suspends this processing immediately for canceling the command on the access request when an abnormality occurs on the processing in the hierarchy control unit 21 and notifies this fact to the host computer 40, thereby enabling the processing with high efficiency.

[2] Others

It should be understood that the present invention is not limited to the above-described embodiment, and that it is intended to cover all changes and modifications of the embodiment of the invention herein which do not constitute departures from the spirit and scope of the invention.

For example, although in the above-described embodiment the first response unit 28 detects an abnormality of the processing in the hierarchy control unit 21 (readout processing on processing data in the readout unit 24, and processing in the data processing unit 27), the present invention is not limited to this, but it is also acceptable if the abnormality of the processing in the hierarchy control unit 21 is detectable in the hierarchy control unit 21.

In addition, the functions as the above-mentioned hierarchy control unit 21, mapping table 22, retrieval unit 23, readout unit 24, updating unit 25, first timer 26, data processing unit 27, first response unit 28, second timer 30, second response unit 31 and implementation unit 42 can also be realized by executing a predetermined application program (storage control program) in a computer (including CPU, information processing unit and various terminals).

This program is furnished in a state recorded in a computer-readable recording medium such as flexible disk, CD-ROM, CD-R, CD-RW or DVD or the like. In this case, for use, the computer reads, for example, a storage control program from the recording medium and transfers it to an internal storage unit or an external storage unit for putting therein. Moreover, it is also possible that the program is recorded in, for example, a storage unit (recording medium) such as magnetic disk, optical disk or magneto optical disk and is then provided from this storage unit through a communication line to the computer.

In this case, the computer denotes the concept including a hardware and an OS (Operating System) and signifies a hardware to be operated under control of the OS. Moreover, in a case in which the OS is unnecessary and the application program operates the hardware on its own, the hardware itself corresponds to the computer. The hardware is equipped with at least a microprocessor such as CPU and a means for reading out a computer program recorded on a recording medium. The application program serving as the aforesaid storage control program includes a program code for making the computer realize the functions as the above-mentioned hierarchy control unit 21, mapping table 22, retrieval unit 23, readout unit 24, updating unit 25, first timer 26, data processing unit 27, first response unit 28, second timer 30 and second response unit 31. A portion of these functions can also be realized with an OS in place of the application program.

Furthermore, as the recording medium in this embodiment, in addition to the above-mentioned flexible disk, CD-ROM, CD-R, CD-RW, DVD, magnetic disk, optical disk and magneto optical disk, various types of computer-readable mediums are available, including IC card, ROM cartridge, magnetic tape, punch card, internal storage unit (memory such as RAM and ROM), external storage unit and code-printed matters such as bar codes.

What is claimed is:

1. An information processing system comprising:
    a library unit for retaining data;
    a storage unit connected to said library unit and having a storage for retaining a portion of the data of said library unit; and
    a data processing apparatus connected to said storage unit for gaining access to data of said storage of said storage unit,
    said storage unit including:
        a readout unit for, when processing data which is an object of processing in said data processing apparatus is not retained in said storage of said storage unit, reading said processing data from said library unit into said storage according to an access request, issued from said data processing apparatus, for access to said processing data;
        a first timer for, when said readout unit reads said processing data from said library unit into said storage according to said access request from said data processing apparatus, detecting the fact that an elapsed time for readout processing in said readout unit reaches a first predetermined time set in advance; and
        a first response unit for, when the processing in said readout unit continues after said first timer detects said first predetermined time, transmitting a signal indicative of the fact that said readout unit is normally in operation, to said data processing apparatus, and
    said data processing apparatus including:
        an implementation unit for, upon receipt of said signal indicative of the normal in-operation from said first response unit, implementing re-issue of said access request.

2. The information processing system according to claim 1, wherein said storage unit includes:
    a second timer for detecting the fact that an elapsed time after reception of said access request reaches a second predetermined time longer than said first predetermined time to be detected by said first timer; and
    a second response unit for, when the transmission of said signal from said first response unit does not take place after the detection of said second predetermined time by said second timer, transmitting an error signal indicative of occurrence of an abnormality of the processing in said storage unit to said data processing apparatus.

3. The information processing system according to claim 2, wherein said second timer of said storage unit is activated when said storage unit receives said access request from said data processing apparatus, for detecting said second predetermined time.

4. The information processing system according to claim 3, wherein, when the occurrence of an abnormality of the processing in said readout unit is detected before said first timer detects said first predetermined time, said first response unit of said storage unit transmits a signal indicative of the occurrence of the abnormality of the processing in said readout unit to said data processing apparatus.

5. The information processing system according to claim 2, wherein, when the occurrence of an abnormality of the processing in said readout unit is detected before said first timer detects said first predetermined time, said first response unit of said storage unit transmits a signal indicative of the occurrence of the abnormality of the processing in said readout unit to said data processing apparatus.

6. The information processing system according to claim 1, wherein said storage unit includes:
    a mapping table showing a corresponding relation between data retained in said storage and data retained in said library unit; and
    a retrieval unit for retrieving processing data which is an object of processing on said access request on the basis of said mapping table according to said access request from said data processing apparatus to make a decision as to whether or not said processing data is retained in said storage.

7. The information processing system according to claim 6, wherein, when the occurrence of an abnormality of the processing in said readout unit is detected before said first timer detects said first predetermined time, said first response unit of said storage unit transmits a signal indicative of the occurrence of the abnormality of the processing in said readout unit to said data processing apparatus.

8. The information processing system according to claim 1, wherein said first timer of said storage unit is activated when said readout unit starts the readout processing, for detecting said first predetermined time.

9. The information processing system according to claim 8, wherein, when the occurrence of an abnormality of the processing in said readout unit is detected before said first timer detects said first predetermined time, said first response unit of said storage unit transmits a signal indicative of the occurrence of the abnormality of the processing in said readout unit to said data processing apparatus.

10. The information processing system according to claim 1, wherein, when the occurrence of an abnormality of the processing in said readout unit is detected before said first timer detects said first predetermined time, said first response unit of said storage unit transmits a signal indicative of the occurrence of the abnormality of the processing in said readout unit to said data processing apparatus.

11. A storage unit interposed between a library unit for retaining data and a data processing apparatus for processing the data, comprising:
    a storage for retaining a portion of the data in said library unit to be accessible from said data processing apparatus;
    a readout unit for, when processing data which is an object of processing in said data processing apparatus is not retained in said storage, reading said processing data from said library unit into said storage according to an access request, issued from said data processing apparatus, for access to said processing data;
    a first timer for, when said readout unit reads said processing data from said library unit into said storage according to said access request from said data processing apparatus, detecting the fact that an elapsed time for readout processing in said readout unit reaches a first predetermined time set in advance; and
    a first response unit for, when the processing in said readout unit continues after the detection of said first predetermined time by said first timer, transmitting a signal indicative of the fact that said readout unit is normally in operation, to said data processing apparatus so as to make said data processing apparatus re-issue said access request.

12. The storage unit according to claim 11, further comprising:
    a second timer for detecting the fact that an elapsed time after reception of said access request reaches a second predetermined time longer than said first predetermined time to be detected by said first timer; and a second response unit for, when the transmission of said signal from said first response unit does not take place after the detection of said second predetermined time by said second timer, transmitting an error signal indicative of occurrence of an abnormality of the processing in said readout unit to said data processing apparatus.

13. The storage unit according to claim 12, wherein said second timer is activated when receiving said access request from said data processing apparatus, for detecting said second predetermined time.

14. The storage unit according to claim 11, further comprising:

a mapping table showing a corresponding relation between data retained in said storage and data retained in said library unit; and a retrieval unit for retrieving processing data which is an object of processing on said access request on the basis of said mapping table according to said access request from said data processing apparatus to make a decision as to whether or not said processing data is retained in said storage.

15. The storage unit according to claim 11, wherein said first timer is activated when said readout unit starts the readout processing, for detecting said first predetermined time.

16. The storage unit according to claim 11, wherein, when the occurrence of an abnormality of the processing in said readout unit is detected before said first timer detects said first predetermined time, said first response unit transmits a signal indicative of the occurrence of the abnormality of the processing in said readout unit to said data processing apparatus.

17. A computer-readable recording medium recording a storage control program which makes a computer realize a function to control a storage unit interposed between a library unit made to retain data and a data processing apparatus made to process the data and having a storage for retaining a portion of the data in said library unit to be accessible from said data processing apparatus, said storage control program making said computer function as:

a readout unit for, when processing data which is an object of processing in said data processing apparatus is not retained in said storage, reading said processing data from said library unit into said storage according to an access request, issued from said data processing apparatus, for access to said processing data;

a first timer for, when said readout unit reads said processing data from said library unit into said storage according to said access request from said data processing apparatus, detecting the fact that an elapsed time for readout processing in said readout unit reaches a first predetermined time set in advance; and a first response unit for, when the processing in said readout unit continues after the detection of said first predetermined time by said first timer, transmitting a signal indicative of the fact that said readout unit is normally in operation, to said data processing apparatus so as to make said data processing apparatus re-issue said access request.

18. The computer-readable recording medium recording a storage control program according to claim 17, wherein said storage control program makes said computer function as:

a second timer for detecting the fact that an elapsed time after reception of said access request reaches a second predetermined time longer than said first predetermined time to be detected by said first timer; and a second response unit for, when the transmission of said signal from said first response unit does not take place after the detection of said second predetermined time by said second timer, transmitting an error signal indicative of occurrence of an abnormality of the processing in said readout unit to said data processing apparatus.

* * * * *